(12) United States Patent
Beuerle et al.

(10) Patent No.: US 10,369,738 B2
(45) Date of Patent: Aug. 6, 2019

(54) METHOD OF COOLING A FINISH AND PROVIDING COUNTER PRESSURE DURING FORMING OF A CONTAINER

(71) Applicants: Frederick C. Beuerle, Jackson, MI (US); G. David Lisch, Jr., Jackson, MI (US); Richard Steih, Jackson, MI (US); Semen Kharchenko, Ann Arbor, MI (US); Pankaj Kumar, Dexter, MI (US); DISCMA AG, Hunenberg (CH)

(72) Inventors: Frederick C. Beuerle, Jackson, MI (US); G. David Lisch, Jr., Jackson, MI (US); Richard Steih, Jackson, MI (US); Semen Kharchenko, Ann Arbor, MI (US); Pankaj Kumar, Dexter, MI (US)

(73) Assignee: Discma AG, Zürich (CH)

( * ) Notice: Subject to any disclaimer, the term of this patent is extended or adjusted under 35 U.S.C. 154(b) by 261 days.

(21) Appl. No.: 15/314,431

(22) PCT Filed: May 29, 2014

(86) PCT No.: PCT/US2014/039984
§ 371 (c)(1),
(2) Date: Nov. 28, 2016

(87) PCT Pub. No.: WO2015/183280
PCT Pub. Date: Dec. 3, 2015

(65) Prior Publication Data
US 2017/0210051 A1 Jul. 27, 2017

(51) Int. Cl.
| | | |
|---|---|---|
| B29C 49/58 | (2006.01) | |
| B29C 49/12 | (2006.01) | |
| B29C 49/46 | (2006.01) | |
| B29C 49/64 | (2006.01) | |
| B65B 3/02 | (2006.01) | |
| B65B 39/00 | (2006.01) | |
| B29C 49/06 | (2006.01) | |
| B29C 49/66 | (2006.01) | |

(Continued)

(52) U.S. Cl.
CPC .............. *B29C 49/58* (2013.01); *B29C 49/12* (2013.01); *B29C 49/46* (2013.01); *B29C 49/6409* (2013.01); *B65B 3/022* (2013.01); *B65B 39/00* (2013.01); *B29C 49/06* (2013.01); *B29C 2049/4664* (2013.01); *B29C 2049/5803* (2013.01); *B29C 2049/5889* (2013.01); *B29C 2049/6684* (2013.01); *B29K 2105/258* (2013.01); *B29L 2031/712* (2013.01)

(58) Field of Classification Search
None
See application file for complete search history.

(56) References Cited

U.S. PATENT DOCUMENTS

2013/0164404 A1 6/2013 Maki et al.

FOREIGN PATENT DOCUMENTS

| WO | 2003/022548 A1 | 3/2013 |
|---|---|---|
| WO | 2013/096609 A1 | 6/2013 |
| WO | 2013/145511 A1 | 10/2013 |

*Primary Examiner* — Monica A Huson
(74) *Attorney, Agent, or Firm* — Eric J. Sosenko; Jonathan P. O'Brien; Honigman LLP

(57) ABSTRACT

A method of forming a plastic container from a preform that includes cooling and optionally providing counter pressure to a finish of a preform during forming of a container. During the method, an injection nozzle directs a cooling medium into a receiving space into which the finish is received.

18 Claims, 14 Drawing Sheets

(51) Int. Cl.
*B29K 105/00* (2006.01)
*B29L 31/00* (2006.01)

METHOD OF COOLING A FINISH AND PROVIDING COUNTER PRESSURE DURING FORMING OF A CONTAINER

CROSS-REFERENCE TO RELATED APPLICATIONS

This application is the U.S. national phase of PCT Application No. PCT/US2014/039984 filed on May 29, 2014, the disclosure of which is incorporated in its entirety by reference herein.

BACKGROUND

1. Field of the Invention

The present invention generally relates to a hydraulic blow molding of a container from a preform, wherein the end product, a liquid, is used as the blow molding medium. More specifically, the present invention relates to preventing distortion and/or deformation of the finish of a preform during the hydraulic blow molding process.

2. Description of Related Art

Plastic containers for liquids are manufactured by various different methods. In most methods, a plastic preform is heated to a suitable temperature for molding, placed within a mold and then expanded axially in radially to form the container. In certain processes, air is used as a blow molding medium to expand the preform. In other processes, the liquid product is used as the blow molding medium. This latter process, using the liquid end product as the blow molding medium, is herein referred to as hydraulic blow mold.

With hydraulic blow molding, the blow molding medium is injected under pressure and generally, in a non-hot fill process, at a temperature in the range of about 0° C. to 32° C. (32° F. to 90° F.) and, in a hot fill process, at a temperature of between about 85° C. and 95° C. (about 185° F. to 195° F.). In many instances, as seen from these temperature ranges, the temperature of the blow molding medium is greater than ambient.

While the body of the preform is axially elongated in radially expanded during the hydraulic blow molding process, the neck or finish of the preform is intended to remain in its initially formed shape. It is important that the finish remain in its initially formed shape since the finish includes threads and sealing surfaces that must be engaged by a closure. It is possible that during hydraulic blow molding, particularly when the blow molding medium as an elevated temperature relative to the temperature of the preform, that the finish will distort and/or deformed as a result of either exposure to the temperature of the blow molding medium or its injection pressure. This becomes more likely when the wall thickness of the finish is reduced in an effort to make the resultant container more light weight.

In order to protect the finish, various strategies have been proposed. US 2013/0164404 discloses a system in which a counter pressure is applied to the exterior of the finish during the blow molding process. WO 2013/145511 similarly discloses a system in which a counter pressure is applied to the exterior of the finish during the blow molding process.

In view of the above, it is apparent that there exists a need for a system in which the finish of a preform is protected during the hydraulic blow molding process, not only from pressure interior of the preform during the process, but also from temperatures of the blow molding medium that result in the finish being susceptible to deformation and distortion.

SUMMARY

In satisfying the above need, as well as overcoming the enumerated drawbacks and other limitations of the prior art, in one aspect of the present invention, a method of forming a plastic container from a preform, and filling the same, is provided.

In another aspect, the method of forming a plastic container from a preform comprising the steps of: providing a preform having a body with a finish defined on one end of the preform; engaging an injection nozzle with the finish to form a first sealed engagement between the injection nozzle and the finish, the first sealed engagement separating an inner volume from an exterior side of the finish; injecting a liquid blow medium into the preform to expand the body of the preform within a mold thereby simultaneously forming a container and filling the container with the liquid, the method characterized by applying a cooling medium at the exterior side of the finish, the cooling medium being provided at a temperature that is less than the temperature of the finish. Applying a cooling medium to the exterior side of the finish during the forming procedure advantageously mitigates possible deformation of the finish during the forming procedure. Since the preform is already at an elevated temperature as a result of its formation in a one-step liquid blow molding procedure, the cooling medium aids in cooling the finish as the preform is being exposed to increased pressures, and possibly increased temperatures, during forming and filling of the container. This further allows for better seal integrity once the container has received a closure cap.

In a further aspect, the step of applying the cooling medium to the finish is initiated at least after the step of engaging the injection nozzle with the finish. Applying the cooling medium to the finish after engagement of the injection nozzle with the finish conserves the amount of cooling medium used during the production cycle and provides the cooling in a more confined space to better effectuate cooling of the finish.

In an additional aspect, the step of applying the cooling medium to the finish is initiated at least before the step of engaging the injection nozzle with the finish. By applying the cooling medium before the finish is engaged by the injection nozzle, cooling is initiated earlier in the production process thereby allowing for a greater amount of cooling of the finish.

In yet another aspect, the step of applying the cooling medium to the finish occurs both before and after the step of engaging the injection nozzle with the finish. Applying cooling medium both before and after engagement of the injection nozzle and the finish maximizes the cooling effect on the finish.

In still a further aspect, the step of forming a second sealed engagement between the injection nozzle and one of the preform and the mold, the second sealed engagement being axially spaced from the first sealed engagement along the preform. By forming a second sealed engagement, one that is axially spaced from the first sealed engagement, a closed chamber is formed about the finish, allowing for better control over the providing and exhausting of the cooling medium from around the finish.

In still another aspect of the invention, the second sealed engagement is formed between the injection nozzle and a portion of the mold. The forming of second sealed engagement allows for more precise control over the providing of the cooling medium, and forming the second sealed engagement between the injection nozzle and a portion of the mold allows the method to be used with a wide variety of preform designs.

In yet a further aspect, the second sealed engagement is formed between the injection nozzle and a support ring of the preform.

In an additional aspect, the method further comprises the step of distributing the cooling medium about the finish. By distributing the cooling medium about the finish, cooling of the finish is evenly achieved preventing distortions that might result from localized cooling of the finish.

In another aspect of the invention, the step of circulating of the cooling medium is done one of continuously or intermittently. With continuous circulation of cooling medium, the finish is consistently cooled throughout the production cycle. Intermittent cooling allows for application of the cooling medium in a targeted manner at the more critical times of the production cycle.

In a further aspect of the invention, the step of applying the cooling medium includes the step of directing the cooling medium at the finish. Directing the cooling medium at the finish enhances the efficiency of the cooling.

In an additional aspect of the invention, the cooling medium is directed perpendicularly at the finish. By directing the cooling medium perpendicularly at the finish, the cooling medium, the intensity of the cooling effect is increased.

In still another aspect, the cooling medium is directed obliquely at the finish. Obliquely directing cooling medium allows for the cooling medium to wash over the finish and begin cooling of the finish prior to the finish being fully received by the injection nozzle.

In yet a further aspect of the invention, the step of thermally conditioning the preform occurs prior to the positioning step.

In yet another aspect, the cooling medium is applied during lowering of the injection nozzle. Applying cooling medium while the injection nozzle is being lowered allows cooling to begin earlier in the production cycle.

In still a further aspect of the invention, a counter pressure is applied about the finish. Applying a counter pressure mitigates deformation of the finish caused by an increased pressure within the preform during forming of the container.

In an additional aspect, the counter pressure is provided by restricting the exhausting of the cooling medium from a receiving space located about the finish. In another aspect, the step of restricting the exhausting of the cooling medium is performed by providing an exhaust gap or outlet passageway with a reduced cross-sectional area relative to a cumulative cross-sectional area of an inlet passageway or ports. By restricting the exhausting of the cooling medium, a counter pressure can be selectively built up around the finish.

In a further aspect, the step of restricting the exhausting of the cooling medium is performed by controlling a variable restriction of an outlet passageway for the cooling medium. By utilizing a variable restriction, more precise control can be employed in providing the counter pressure to the finish.

In an additional aspect, the step of restricting the exhausting of the cooling medium is performed by providing no exhausting of the cooling medium. Without an exhaust for the cooling medium, counter pressure can be quickly established in the production cycle.

In an additional aspect, the step of providing the counter pressure includes providing a continuous or intermittent flow of the cooling medium. Counter pressure can therefore be tailored to the specific production cycle and efficiently applied.

Further objects, features and advantages of this invention will become readily apparent to persons skilled in the art after a review of the following description, with reference to the drawings and claims that are appended to and form a part of this specification.

DETAILED DESCRIPTION

Figure 1:
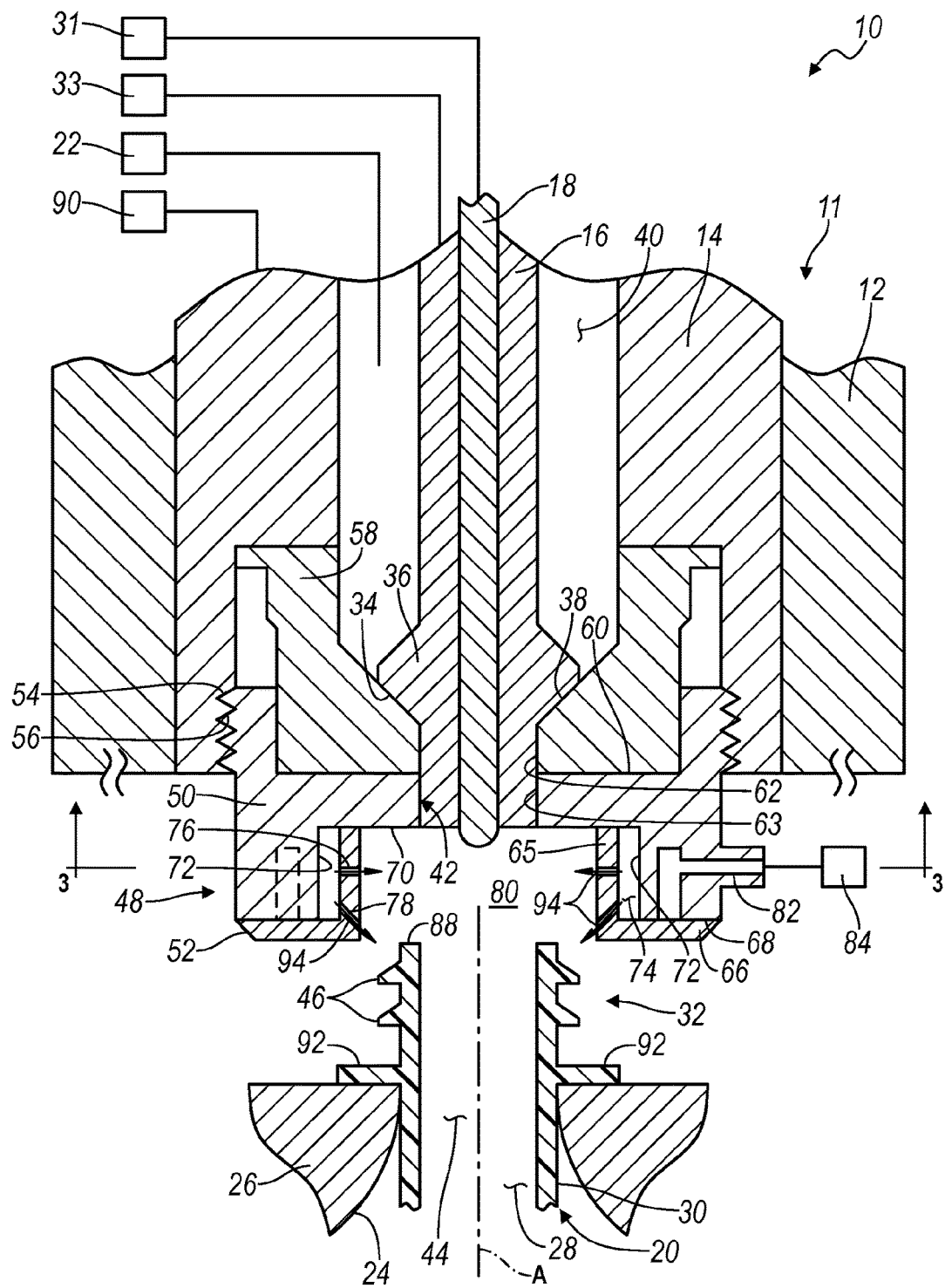
FIG. 1 is a cross-sectional view of a hydraulic blow molding machine embodying the principles of the present invention before engagement of the injection nozzle with a preform.
Figure 2:
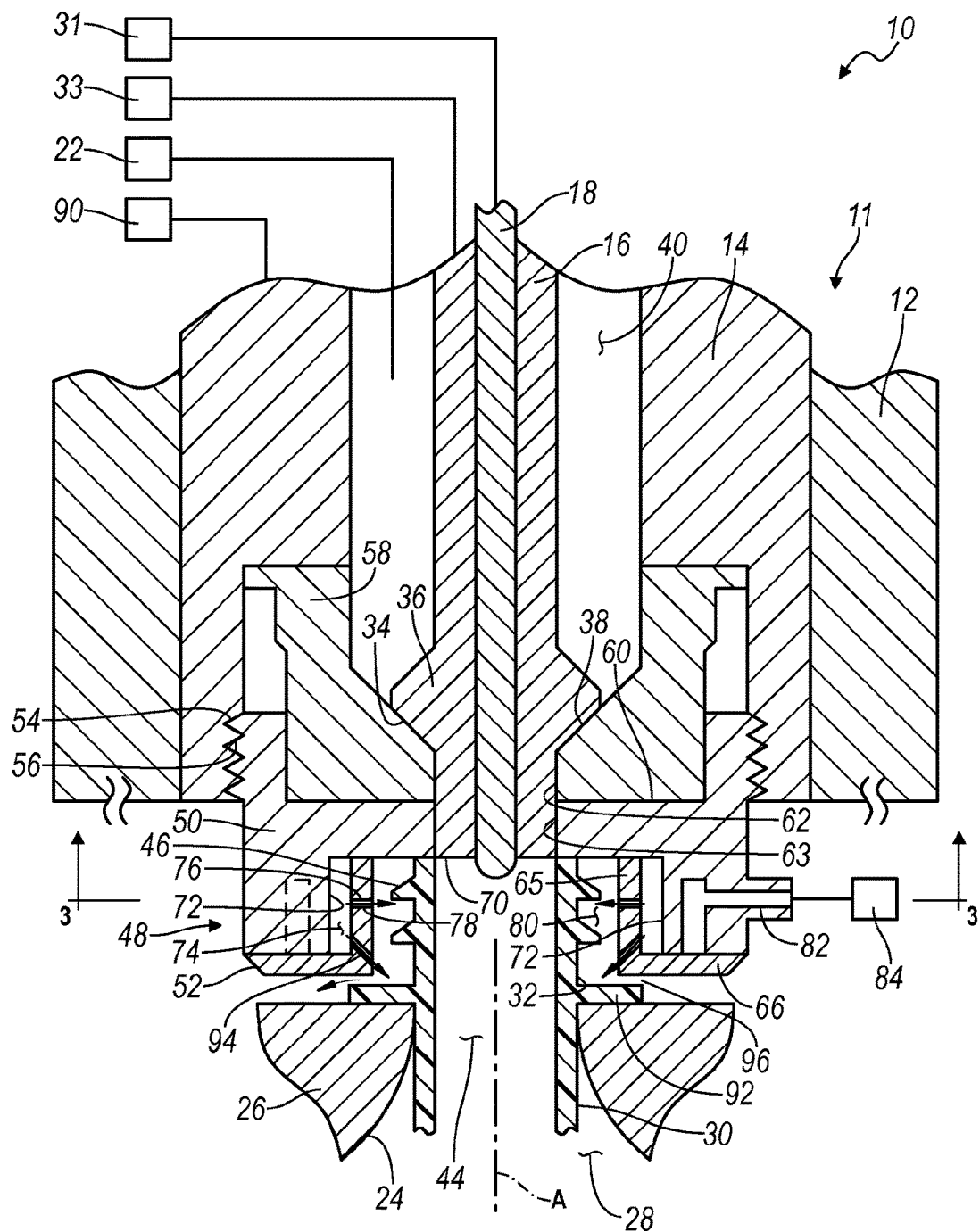
FIG. 2 is a cross-sectional view of the hydraulic blow molding machine seen in FIG. 1 after engagement of the injection nozzle with the preform and showing the exhausting of air between the injection nozzle and the support ring of the preform.

Referring now to the drawings, a hydraulic blow molding machine, used to form a container from a preform, and embodying the principles of the present invention, is schematically illustrate in the figures and generally designated at 10. As its primary components, and as seen in FIGS. 1 and 2, the hydraulic blow molding machine 10 includes an injection head 11 having a housing 12 within which are coaxially located an injection nozzle 14, a seal pin 16 and a stretch rod 18.

The injection head 11 is coupled to a source of blow medium 22 (a liquid that is also the end product retained within the formed container) that is used to expand the preform, designated at 20, into conformity with interior surfaces 24 of a mold 26 that define a mold cavity 28 in the desired shape of the resultant container.

Preforms utilized with the present invention are generally formed by an injection molding process and may be made of any suitable plastic material, such as polyesters including polyethylene terephthalate (PET), polyethylene naphthalate (PEN), and polyethylene imine (PEI), polyolefins including low and high density polyethylene (LDPE and HDPE, respectively) and polypropylene (PP), styrene based materials including polystyrene (PS), acrylonitrile butadiene styrene (ABS) or other polymers including polyvinyl chloride (PVC). The above listing of materials is for illustrative purposes only and is not intended to limit the scope of the invention or the materials used.

The preform 20 has a hollow body 30 extending from an open neck or finish 32, generally along a central axis A, to a closed end (not shown). During molding of the preform 20 into a container, the stretch rod 18 is axially extended by an actuator 31 to elongate the body 30 and the seal pin 16 is retracted by another actuator 33 such that a seal ring 34, defined on a head 36 of the seal pin 16, is disengaged from sealing engagement with a seal seat 38 provided as part of the injection nozzle 14. With the seal ring 34 disengaged from the seal seat 36 and the seal pin 16 sufficiently retracted, the blow medium flows from a central passageway 40 within the injection nozzle 14 through an exit orifice 42 so as to be injected into the interior 44 of the preform 20. As alluded to above, the pressure exerted by the blow medium causes the body 30 of the preform 20 to expand into conformity with the interior surfaces 24 of the mold 26, resulting in formation of the container.

While the body 30 of the preform 20 is elongated and expanded during forming of the container, the finish 32 is provided in its final form and typically includes threads 46 for engagement with corresponding threads of a closure cap (not shown). During hydraulic blow molding, the blowing medium may be at a temperature above ambient and may come in contact with the interior surfaces of the finish 32. As finishes of containers are increasingly being made thinner, to reduce the overall weight of the container, concerns arise that the elevated temperature of the blowing medium may enable distortion and deformation in the shape of the finish, particularly when coupled with the injection pressure of the blow medium, thereby preventing proper engagement by a closure cap. The hydraulic blow molding machine 10, and more specifically the injection nozzle 14, disclosed herein is provided with features that counter and mitigate possible deformation and distortion of the finish 32.

As seen in FIGS. 1 and 2, the end of the injection nozzle 14 is constructed to provide for the cooling of the finish 32 during the hydraulic blow molding process. In this regard, a cooling device 48 is provided as an integral part of the injection nozzle 14. The cooling device 48, which may be referred to as a nozzle body, includes a bell housing 50 and a diffuser 52.

As illustrated, the bell housing 50 is secured to the lower end of the injection nozzle 14 by the engagement of external threads 54 of the bell housing 50 with internal threads 56 of the injection nozzle 14. Other securement means, such as threaded fasteners, could alternatively be employed for this purpose. Also in the illustrated construction, the bell housing 50 is used to secure a sealing bell 58 to the injection nozzle 14 as an integral part thereof. The sealing bell 58 includes the surfaces that cooperate to define central passageway 40 and the seal seat 38 mentioned above. To secure the sealing bell 58, the lower end of the sealing bell 58 is provided with a shape that is received within a correspondingly shaped upper recess 60 formed in an upper end of the bell housing 50, generally adjacent and inwardly of the threads 54. When the bell housing 50 is secured to the injection nozzle 14, a central orifice 62 of the sealing bell 58 is aligned with and extends from a central orifice 63 of the bell housing 58, which together define the exit orifice 42 of the central passageway 40 and injection nozzle 14.

In the lower end of the bell housing 50, opposite of the upper recess 60, the bell housing 50 includes a lower recess 64, within which a portion of the diffuser 52 is received. The diffuser 52 includes a cylindrical wall 65 that is coaxial with the axis-A and a radial flange 66 that extends outwardly from the cylindrical wall 65. In securing the diffuser 52 to the bell housing 50, the upper surface of the radial flange 66 engages the lowermost surface or end face 68 of the bell housing 50 and is secured by threaded fasteners (not shown) that extend through the radial flange 66 into the bell housing 50 or other means. The cylindrical wall 65 is received within the lower recess 62 of the bell housing 50, as mentioned above, and is provided with a length so that its distal end in engagement with a base wall 70 of the lower recess 64. The cylindrical wall 65 is also provided with an outer diameter or width that is less than a width or inner diameter defined between sidewalls 72 of the lower recess 64. As a result, portions of the cylindrical wall 64, radial flange 66, base wall 70 and sidewall 72 cooperate to define a cavity 74 within the manifold 48.

Figure 8:
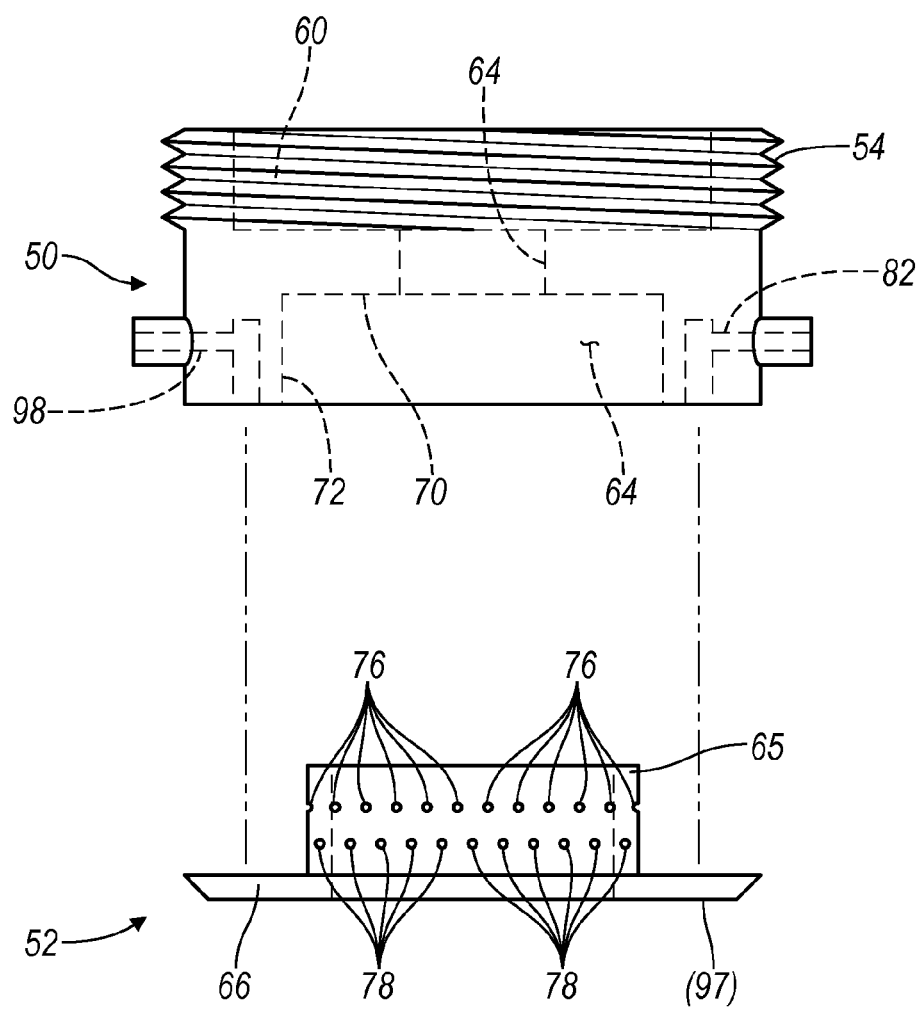
FIG. 8 is an exploded side elevational view of a cooling device embodying the principles of the present invention and that is integrated on the lower end of an injection nozzle; ports in a portion of the cooling device are shown as being arranged in a pair of offset rows.

Additionally, it is noted at this time that ports 76, 78 are defined through the diffuser 52 such that the cavity 74 is in fluid communication with a receiving space 80 that is encompassed and encircled by both the cylindrical wall 64 and the cavity 74. For reasons further explained below, the ports 76, 78 are respectively directed radially and obliquely, relative to the axis-A, into the receiving space 80, and are preferably defined through the cylindrical wall 65 of the diffuser 52. In one preferred embodiment, the ports 76, 78 are arranged in two or more rows around the cylindrical wall 64. The ports 76, 78 may be further arranged such that the ports of one row are radially aligned or radially offset from the ports of the other row. The arrangement of the ports 76, 78 in radially offset rows is best seen FIG. 8 while radially aligned rows are seen in the other figures. It will be appreciated that the diffuser 52 shown in FIG. 8 can alternatively be employed in all embodiments discussed herein.

The bell housing 50 additionally includes an inlet passageway 82 that is coupled to a pressurized source of a cooling medium 84 and that communicates the cooling medium from the source 84 to the cavity 74. The medium is preferably air or another gaseous fluid, so long as the medium has the desired characteristics and meets purposes discussed herein.

Figure 3A:
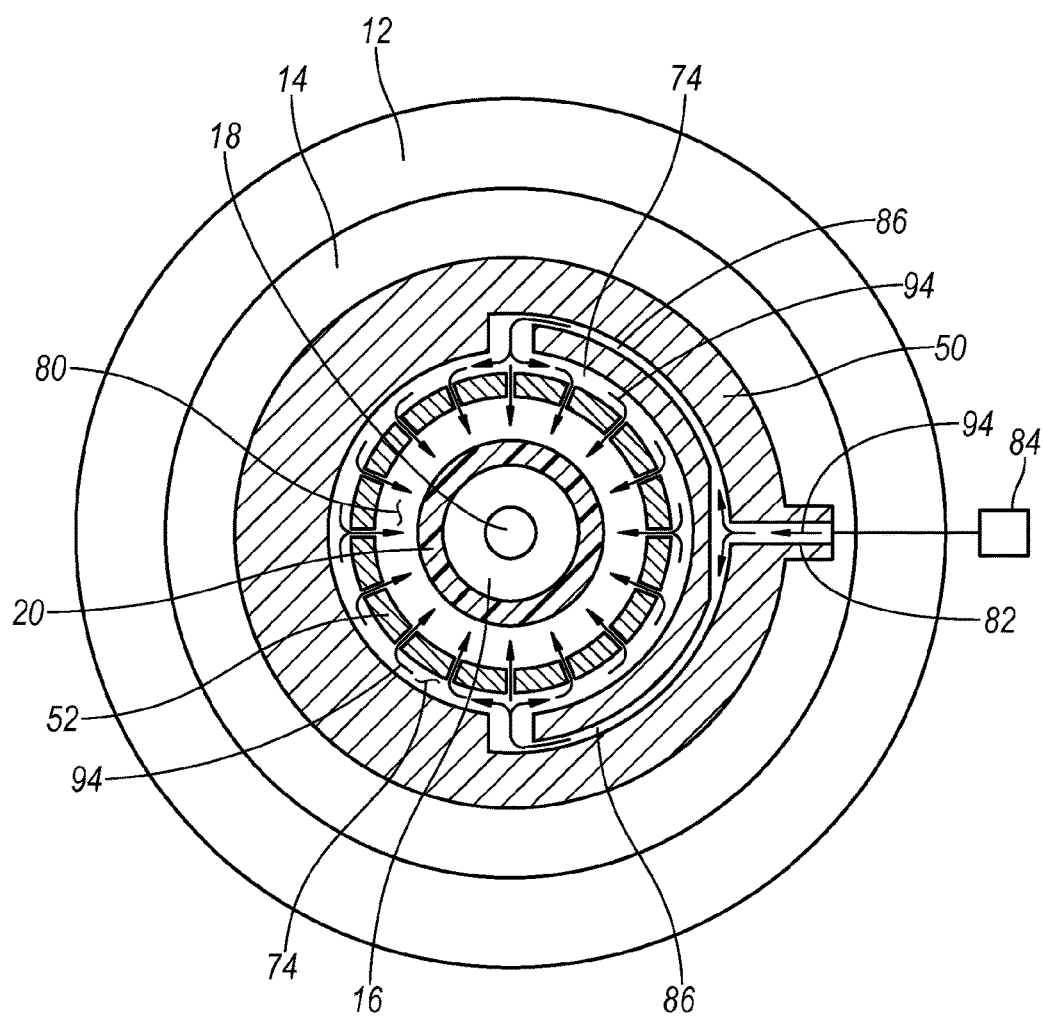
FIG. 3A is a cross-sectional view generally taken along line 3-3 in FIG. 2 and showing a branched inlet passageway within a portion of the injection nozzle.
Figure 3B:
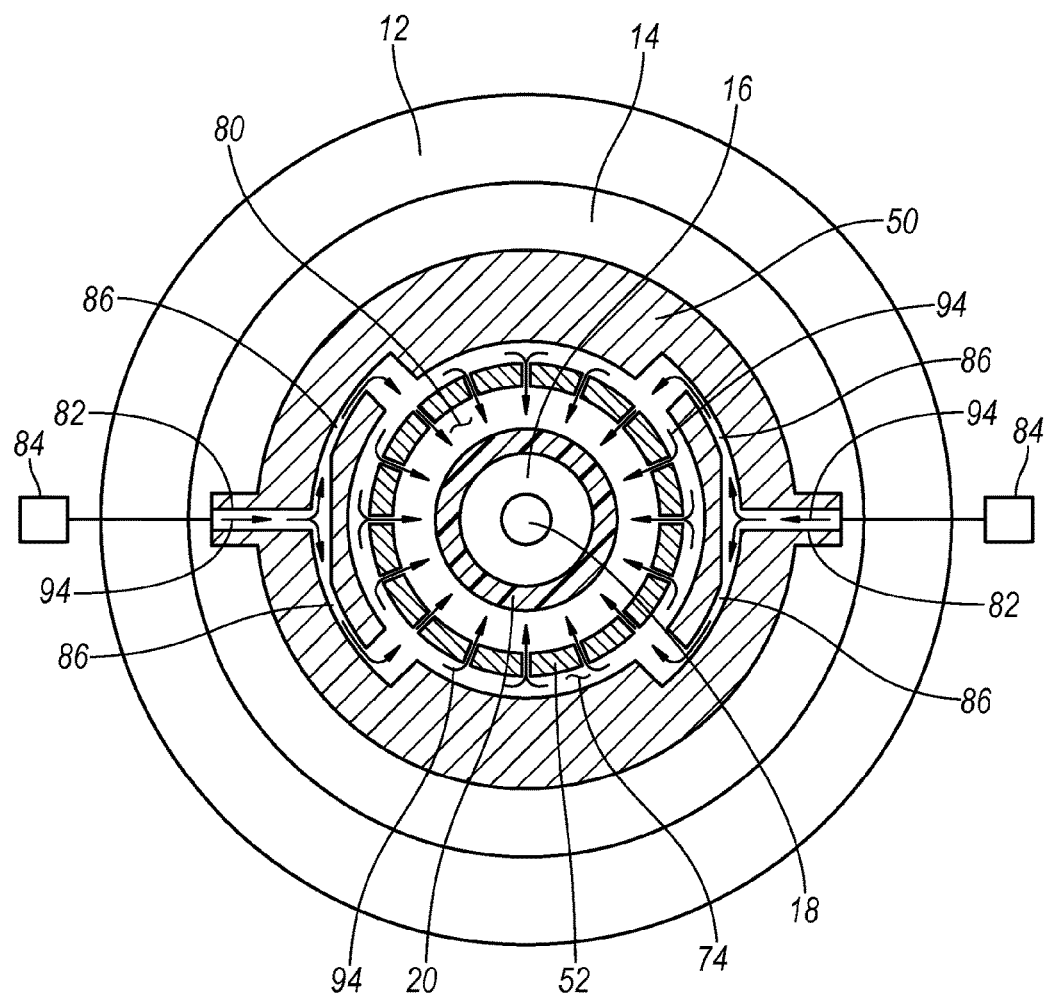
FIG. 3B is a cross-sectional view generally taken along line 3-3 in FIG. 2 showing more than one branched inlet passageway within a portion of the injection nozzle.
Figure 5A:
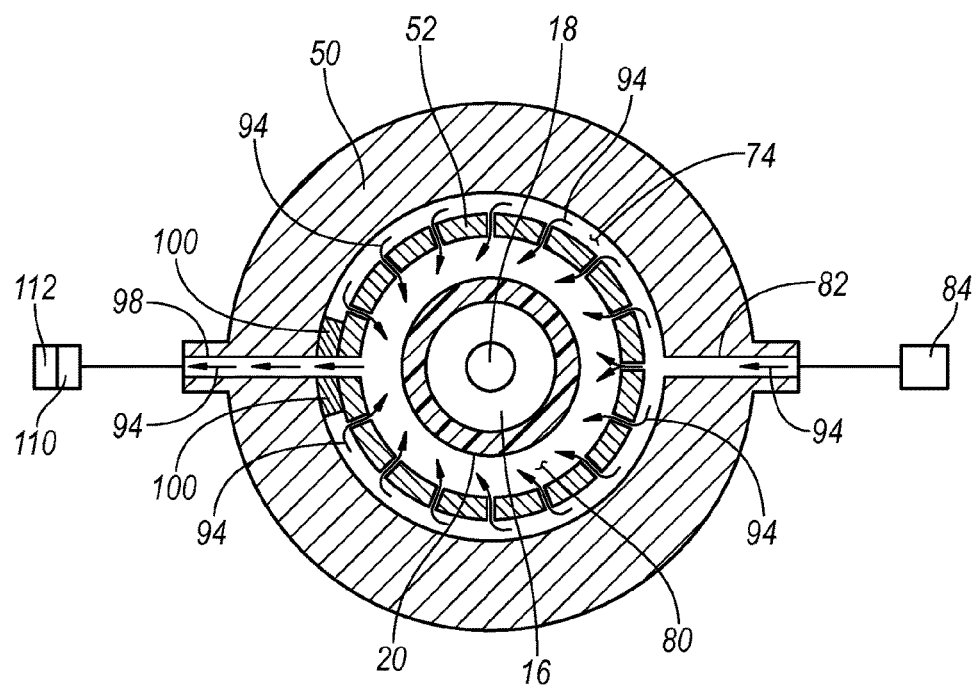
FIG. 5A is a cross-sectional view generally taken along line 5-5 in FIG. 4 and showing variants on how the inlet and outlet passageways may be configured.

As seen in the variants of FIGS. 3A, 3B and 5A, the inlet passageway 82 may be provided in a variety of configurations. In one variant, the inlet passageway 82 extends straight through the wall of the bell housing 50 and terminates in the cavity 74, as seen in FIG. 5A. In another variant, the inlet passageway 82 is branched (designated at 86 in the figures) and extends part-way about the bell housing 50 before terminating into the cavity 74 at diametrically opposed locations, as shown in FIG. 3A. In another variant, the inlet passageway 84 may be defined by multiple passageways 82 that extends in either a straight or branched 86 manner (the latter being shown in FIG. 3B) before terminating into the cavity 74. When branched 86, it is preferred that the inlet passageway 82 terminates into the cavity 74 at locations that are equidistantly spaced about the cavity 74. In this way, the cooling medium is more evenly distributed when provided into the cavity 74. Once provided into the cavity 74, the cooling medium is passed through the ports 76, 78 and directed by the ports 76, 78 into the receiving space 80, and as discussed below, at the finish 32 of a preform 20 located therein.

As seen FIG. 1, the injection head 11 is initially spaced apart from the preform 20 and the mold 26 at the beginning of the hydraulic blow molding process. Prior to being introduced into the mold 26, the body 30 of the preform 20 has been thermally conditioned (heated) to a temperature that will allow the body 30 to be actually stretched by the stretch rod 18 and radially expanded as the blow medium is injected into the interior 44 of the preform 20. In hydraulic blow molding, the blow medium is a liquid, and herein that term is intended to encompass non-gas, flowable mediums. The blow medium may have a low viscosity (like water or alcohol), a medium viscosity (like edible oil or soup) or a high viscosity (like ketchup or yogurt). Also, the blow medium may be homogeneous or non-homogeneous and is not intended to be limited to beverages or foodstuff. Non-limiting illustrative examples of other liquids that may be utilized include cleansing products (for body, house or automotive care), medical fluids, industrial fluids, automotive fluids, and agricultural fluids.

In non-hot fill applications, the blow medium may be provided into the preform at temperatures in the range of about 0° C. to 32° C. (32° F. to 90° F.), but is typically provided at a temperature above ambient and/or the temperature of the body 30 of the preform 20 to minimize freezing of the plastic material during stretching and expansion. During hot fill applications, the blowing medium 22 is provided into the preform 20 at a temperature between about 85° C. and 95° C. (about 185° F. to 195° F.). As a result of the above elevated temperatures, as well as the pressure at which the blow medium is provided, the potential exists for the finish 32 of the preform 20 to be deformed or distorted during the hydraulic blow molding process, particularly when the finish has a thinner wall thickness.

Additionally, at the start of the hydraulic blow molding cycle, the injection nozzle 14 is lowered by its actuator 90 until the finish 32 of the preform 20 is received within the receiving space 80 and injection nozzle engages the preform 20. More specifically, the surface (a first sealing surface) of the base wall 70 of the bell housing 50 sealingly engages with the end surface 88 of the finish 32, forming a first seal therebetween. The downward force exerted by the injection nozzle 14 compressively loads the finish 32 between the end surface 88 and a support ring 92, the latter of which is engaged with the top surface of the mold 26. As further discussed below, the compressive force of this top load can also potentially contribute to distortion and/or deformation of the finish 32.

To compensate for and counteract deformation of the finish 32, the cooling medium provided through the ports 76, 78 may be operated to cool the finish 32 and counteract the effects of the temperature of injected blow medium, and/or to provide a counter pressure that counteract the pressures exerted on the finish 32 by the blow medium and/or top load.

As seen in FIG. 1, the providing of air through the ports 76, 78 may be initiated prior to the injection nozzle 14 being completely lowered and engaged with the end surface 88 of the finish 32. Thus, as the injection nozzle 14 is lowered and the finish 32 is received within the receiving space 80, the finish 32 will be washed over and cooled by a flow of air, designated at 94, from the ports 76, 78. With some of the ports 78 being oriented obliquely to the axis-A, and therefore the finish 32, the cooling medium begins flowing over the finish 32 in advance of the finish being fully received within the receiving space 80, further augmenting the overall cooling effect. To further enhance the cooling effect, the flow of air 94 may be provided at a temperature that is less than ambient, the finish 32, the body 30 or the blow medium.

In one preferred embodiment, shown in FIGS. 1 and 2, the flow of air 94 is provided primarily to effectuate cooling of the finish 32. As seen therein, with the injection nozzle 14 completely lowered, a gap 96 is provided between the radial flange 66 of the diffuser 52 and the support ring 92. The gap 96 forms as an exhaust pathway thereby allowing the flow of air 94 to exit out of the receiving space 80, substantially without restriction. As a result, minimal counter pressure is build up within the receiving space 80 in this embodiment.

Figure 4:
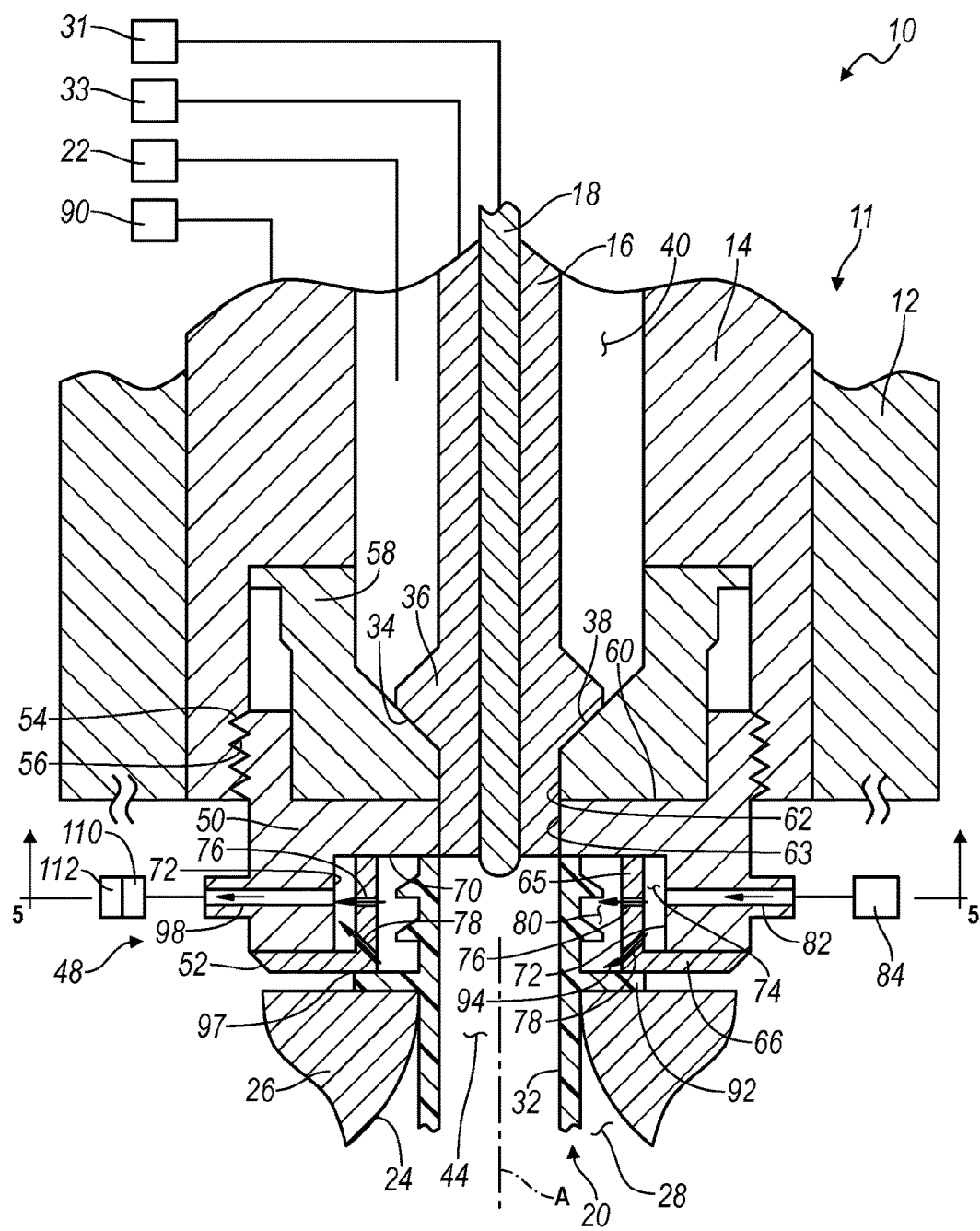
FIG. 4 is a cross-sectional view of a hydraulic blow molding machine according to a second embodiment and showing an outlet passageway that is defined through a portion of the injection nozzle.

In another preferred embodiment, shown in FIG. 4, the length of the manifold 48 in the direction of the axis-A is such that a surface 97 (defining a second sealing surface) of the radial flange 66 of the diffuser 52 sealingly engages the support ring 92 and forms a second seal, spaced axially along the finish 32 from the first seal. With the forming of the second seal, the receiving space 80 is confined and requires an outlet passageway 98 if cooling is to be effectuated by a flow of air 94 over the finish 32. Different variations of outlet passageways 98 are illustrated in FIGS. 5A, 5B, 6 and 7.

As seen in FIG. 5A, both the inlet passageway 82 and the outlet passageway 98 extend in a straight manner through the wall of the bell housing 50. The inlet passageway 82 terminates at the cavity 74, but the outlet passageway 98 is defined so as to communicate with and draw directly from the receiving space 80. In this regard, seals, walls or obstructions 100 are provided in the cavity 74 between the side wall 72 and the cylindrical wall 65 in a manner that seals the outlet passageway 98 from the remainder of the cavity 74 and communicates the outlet passageway 98 directly with the receiving space 80 through one or more of the ports 76, 78. While the inlet passageway 82 is shown in FIG. 5A as extending straight through the wall of the bell housing 50, it will be appreciated that the inlet passageway 82 may alternatively be branched 86, similar to the inlet passageway 82 of the variance seen in FIGS. 3A and 5B.

Figure 5B:
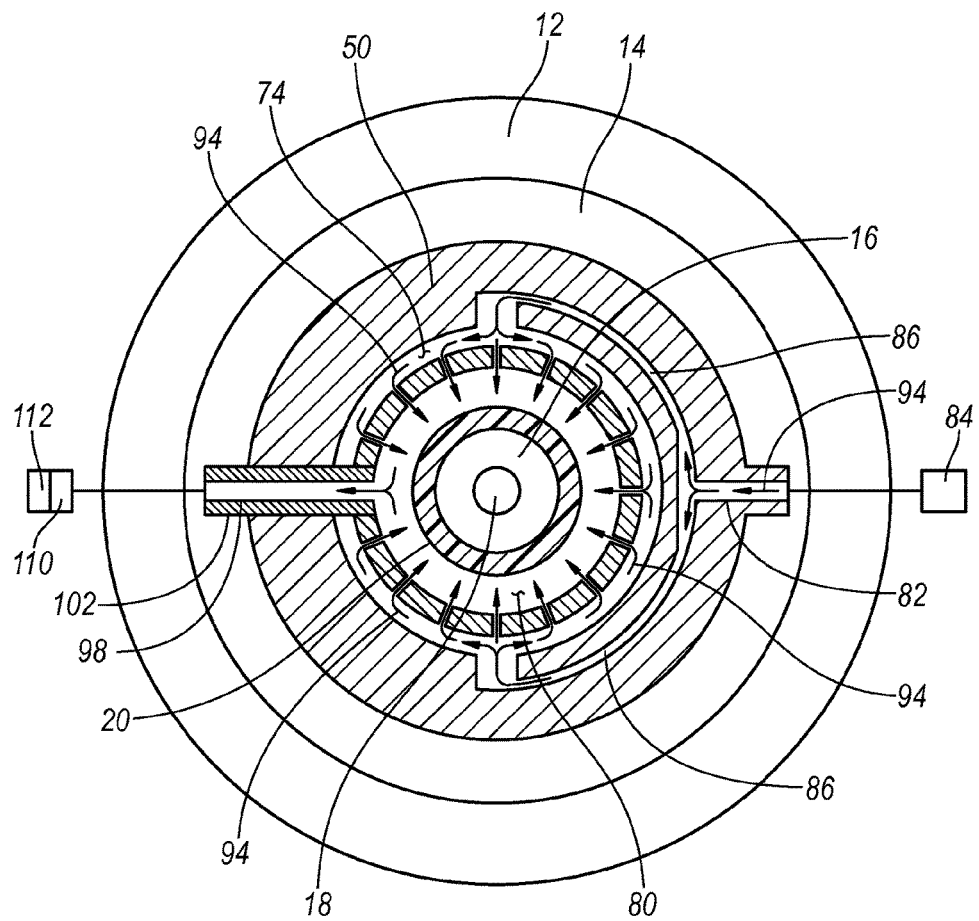
FIG. 5B is a cross-sectional view similar to FIG. 5A and showing additional variants on how the inlet and outlet passageways may be configured.

The outlet passageway 98 may also be defined via an alternative construction than that seen in FIG. 5A. As shown in FIG. 5B, the outlet passageway 98 may be defined by a tube or conduit 102 that extends radially through the bell housing 50, the cavity 74 and the cylindrical wall 64 of the diffuser 52, terminating at the receiving space 80. The outlet passageway 98 may also be provided with a branched construction, similar to the branched construction of the previously discussed inlet passageways 82.

Figure 6:
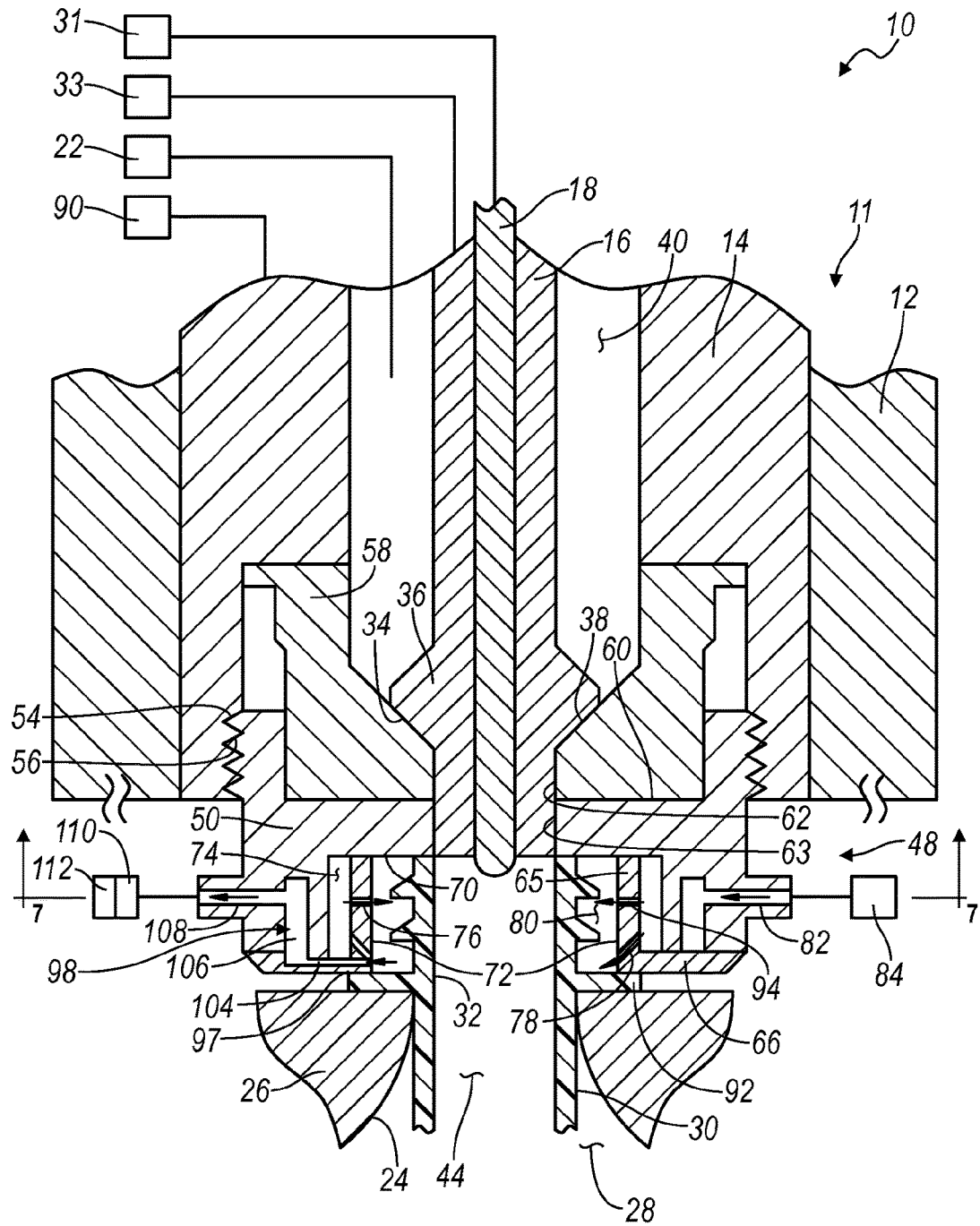
FIG. 6 is a cross-sectional view of a hydraulic blow molding machine and illustrating another variant on how the outlet passageway may be configured to draw air directly from the receiving space.
Figure 7:
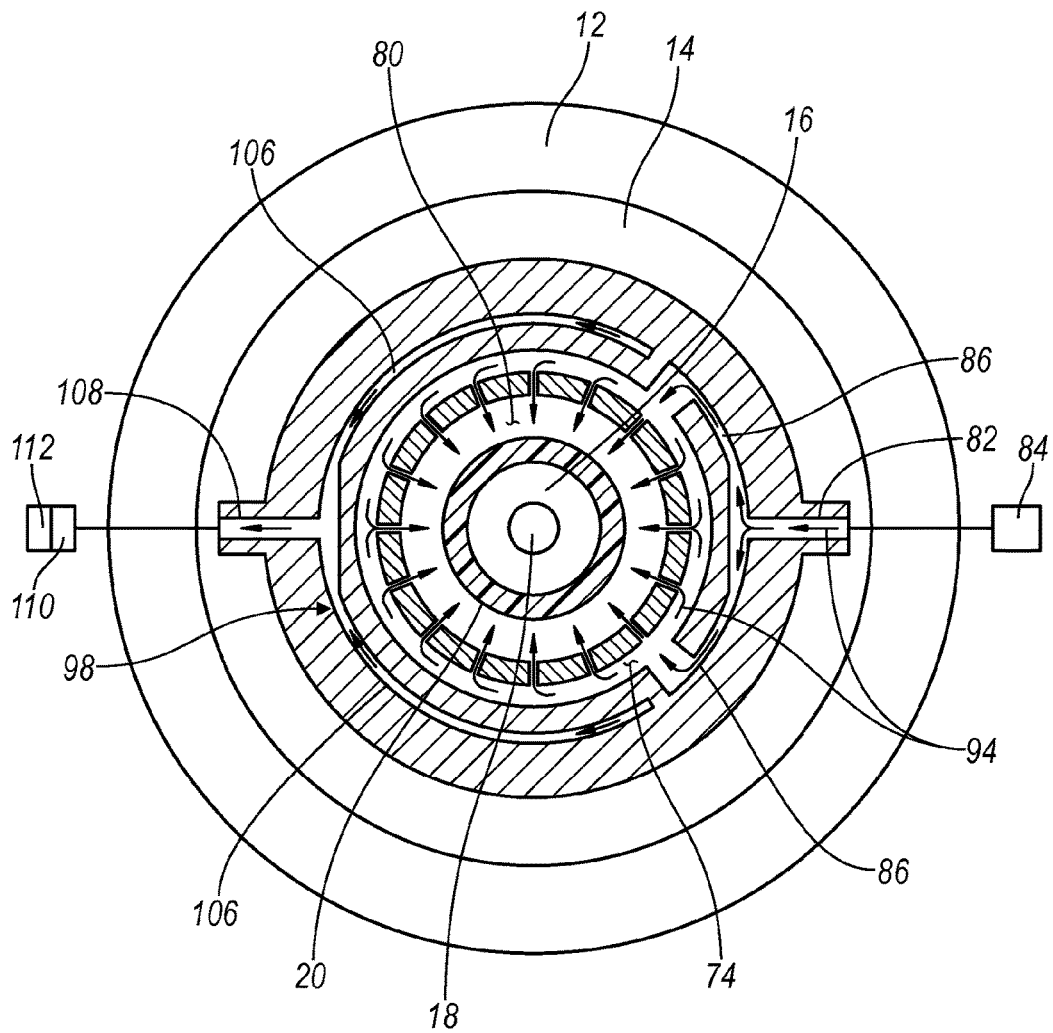
FIG. 7 is a cross-sectional view generally taken along line 7-7 in FIG. 6 and showing portions of the inlet and outlet passageways.

In still another construction, the outlet passageway 98 may extend via a port through both the bell housing 50 and the diffuser 52. In the embodiment of FIGS. 6 and 7, the outlet passageway 98 is defined in part by a series of circumferentially spaced ports 104 (one being shown) that extend from the receiving space 80, radially through the radial flange 66 and then axially through an upper surface of the radial flange 66, where the ports 104 communicate with a channel 106 defined in the bell housing 50. The channel 106, as seen in FIG. 7, extends circumferentially and at least part way about the bell housing 50 and communicates out of the bell housing 50 thorough an exit port 108, somewhat analogous to the inlet passageway 82 and its related branches 86. Providing the channel 106 in this manner facilitates manufacturing by allowing for simple machining and ensures that the outlet passageway 98 can draw from the receiving space 80 in a distributed manner, particularly when the ports 104 are provided in a spaced arrangement in the radial flange 66 of the diffuser 52.

As seen in FIG. 7, the inlet passageway 82 is configured in a manner similar to the embodiment shown in FIG. 3B and includes branches 86. As will be apparent, however, any of the other embodiments for the inlet passageway 82 could be adopted with the outlet passageway 98 shown in FIG. 7.

In the various embodiments, the cooling flow of air 94 is delivered from the medium source 84 through the inlet passageway 82 defined in the bell housing 50. From the inlet passageway 82, the flow of air 94 enters into the cavity 74 defined between the bell housing 50 and the diffuser 52, as previously noted. Since the cavity 74 generally encircles the diffuser 52, the flow of air 94 is distributed substantially completely around the diffuser 52 and provides substantially uniform cooling to the finish 32. This occurs regardless of whether the flow of air 94 is provided through a single inlet into the cavity 74 (as in FIGS. 4 and 5A) or through branched and multiple inlets (as seen in FIGS. 1-3B, 5B, 6, 7 and 9. It is more uniform, however, in the latter instances. From the cavity 74, the flow of air 94 passes through the ports 76, 78 defined in the cylindrical wall 64 of the diffuser 52, which directs the flow of air 94 either perpendicularly or obliquely at the finish 32. If the embodiment is provided with the gap 96 between the radial flange 66 of the diffuser 52 and support ring 92 of the preform 20, the flow of air 94 may be continuously exhausted through the gap 96 to provide the requisite amount of cooling.

If counteracting the internal pressures and forces applied to the finish 32 of the preform 20 is desired, then one of the embodiments including an outlet passageway 98 may utilized to provide both cooling and/or counter pressure. In these embodiments, which are seen in FIGS. 4-7, the outlet passageway 98 is coupled to a valve 110 and variable restriction 112, which may be integrated into a single unit. The valve and variable restriction 110, 112 can be controlled by way of appropriate controllers (not shown) to initially allow for the free flow of air 94 about the finish 32 to effectuate cooling. Once the injection nozzle 14 has engaged the end surface 88 of the finish 32 and injection of the blow medium has begun, the valve and variable restriction 110, 112 may be used to partially restrict and control the flow of air 94 through the outlet passageway 98, thereby establishing a desired counter pressure around the exterior of the finish 32. It is possible that the flow of air 94 may be completely stopped during the establishment of this counter pressure. With the flow of air 94 stopped, however, cooling of the finish 32 will also cease. If the variable restriction 112 is not completely closed, the flow of air 94 will not be completely obstructed and a limited amount of circulation will permitted, allowing both counter pressure and cooling can be applied in a controlled manner to the finish 32. Preferably, the application of the counter pressure is controlled through the variable restriction 112 such that it corresponds to and is coordinated with the peak and holding pressure of the hydraulic blow molding process, both in terms of the magnitude of the pressure and its duration. Because the injection pressure within the preform 20 builds very quickly, it may be practical to initiate the development of the counter pressure during initial forming and expansion of the preform 20, before the actual peak pressure has been reached, and then coordinate the counter pressure with the peak and holding pressures.

Figure 9:
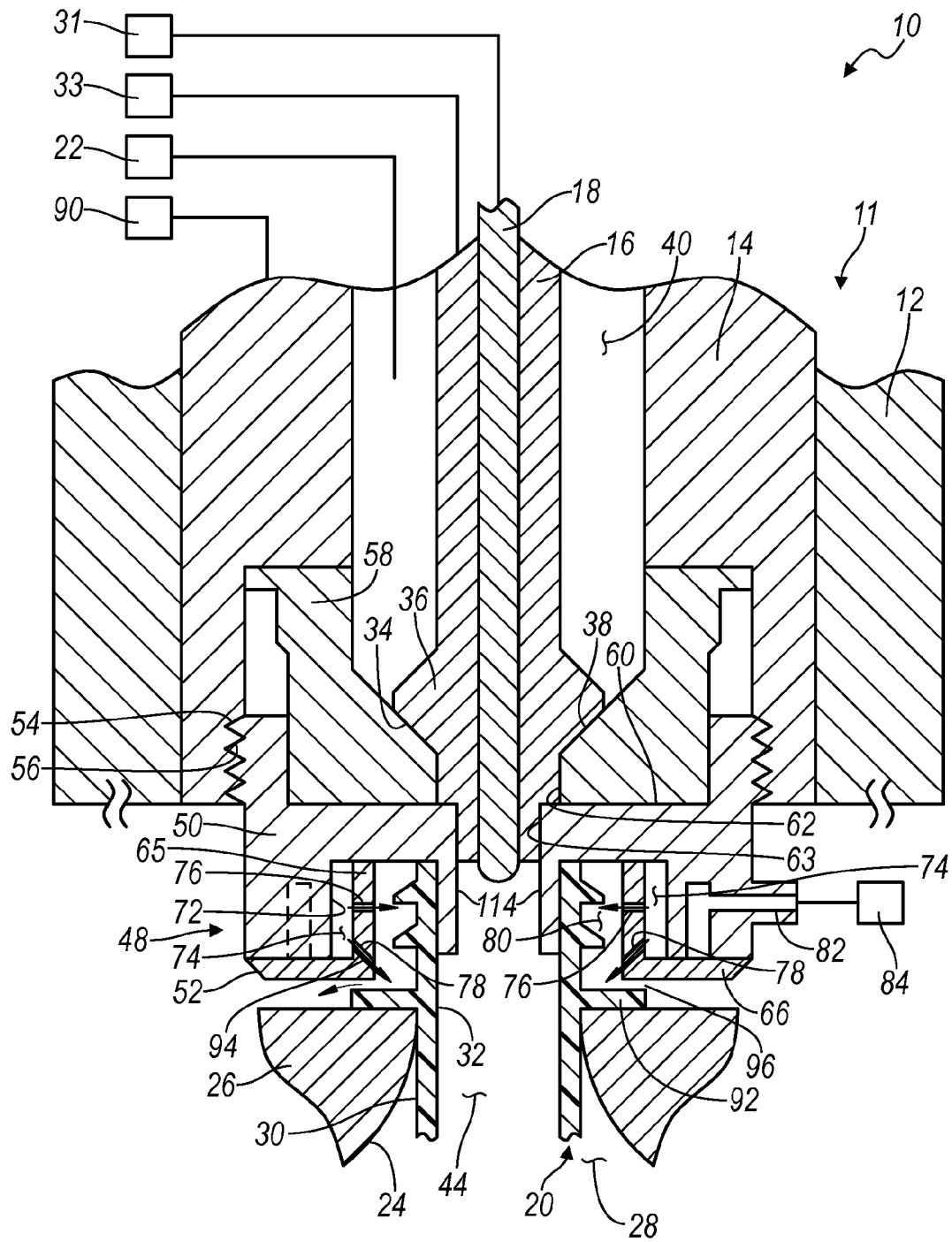
FIG. 9 is a cross-sectional view of hydraulic blow molding machine according to still another embodiment.

Referring now to FIG. 9, an embodiment of the injection head 11 is illustrated therein with a construction substantially the same as that seen in FIGS. 1 and 2. The embodiment of FIG. 9 differs from those earlier embodiments in that the bell housing 50 includes a collar 114 extending axially and defining a portion of the exit orifice 42. When the injection nozzle 14 is engaged with the preform 20, the collar 114 extends into the interior 44 of the preform 20, immediately adjacent to the finish 32. In this manner, the collar 114 supports the finish 32 from the interior and limits exposure of the finish 32 to the temperature of the injected blow medium. It will be appreciated that the collar 114 may be incorporated into any the embodiments discussed herein.

As seen from the discussion presented above, in another aspect the present invention provides a method of forming a container from a preform 20 while cooling the finish 32 of the preform 20 with a flow of air 94 about and over the exterior of the finish 32. A flow chart illustrating a method embodying the principles of the present invention is generally set out in FIG. 10.

Figure 10:
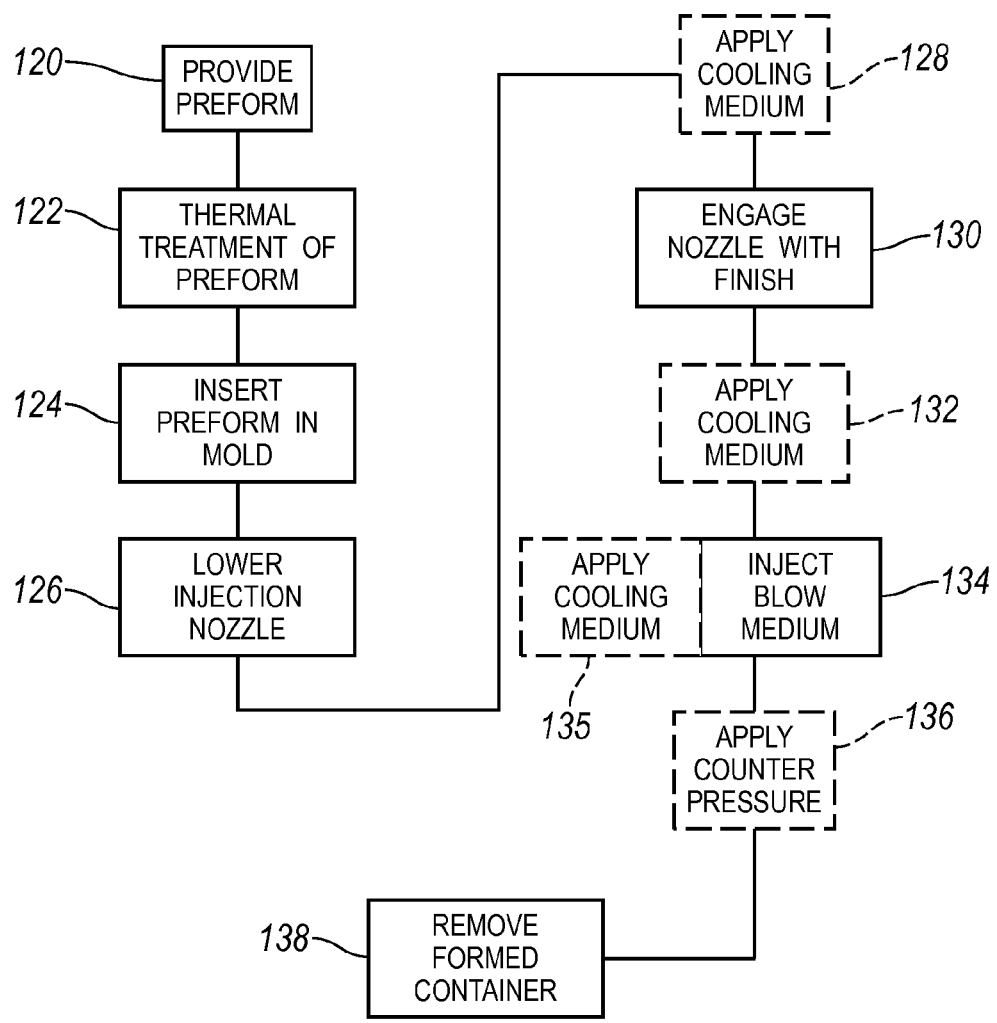
FIG. 10 is a flow chart illustrating the steps of a method for forming and filling a container that incorporates the principles of the present invention.

Referring to now FIG. 10, the method proceeds, at box 120, by first providing a preform 20. As outlined above, the preform 20 includes a body 30 having a closed end and an open end, with a finish 32 defined at the open end. Before being inserted into a mold 26 for the container, as indicated at box 124, if the preform 20 is not initially provided at a temperature suitable for molding of the container, the preform 20 may be thermally treated/heated to a temperature where it is suitable for molding. This is indicated at box 122.

With the preform 20 properly located within the mold 26 and its body 30 suspended within the cavity 28 of the mold 26, the injection nozzle 14 is lowered, as indicated in box 126. As the injection nozzle 14 is being lowered (box 128), a flow 94 of the cooling medium is optionally provided from the source 84 and directed into the receiving space 80, 180 and at the finish 32. Depending on the orientation of the ports 76, 78, as the finish 32 is being received into the receiving space 80, 180, the cooling medium may be directed such that it flows obliquely and/or perpendicularly to the axis-A into the receiving space 80 and along the preform 20. The providing of the cooling medium in an oblique direction allows the cooling medium to wash over the finish 32 and begin cooling even before the finish 32 is fully received in the receiving space 80, 180.

Next, as indicated in box 130, the injection nozzle 14 continues to be lowered until the nozzle body 48, 148, or more specifically the bell housing 50, 150, engages the preform 20. The lowering of the injection nozzle 14 creates at least one sealing engagement between the nozzle 14 and the preform 20. A sealing engagement is at least formed between the end surface 88 and the nozzle body 48, 148. Alternatively, a second sealing engagement may be formed at a location axially spaced from end surface 88, either with another portion of the finish, such as the support ring 92, or with a portion of the mold 26.

If the cooling medium is not already being applied, the cooling medium is now applied to the finish, as designated in box 132, through the ports 76, 78 provided for that purpose. If the cooling medium is already being applied, as in box 128, the cooling medium continues to be applied to the finish 32 after engagement of the injection nozzle 14 with the preform 20. As seen in the various figures, the cooling medium may be exhausted either through a gap 96 between the nozzle body 48, 148 and the preform 20 or between the nozzle body 489, 148 and the mold 26. Alternatively, the cooling medium may be exhausted through an outlet passageway 98 defined in the nozzle body 48, 148. In either instance, the cooling medium may be continuously provided or intermittently provided.

Either simultaneously with the initiation of the cooling medium being applied to the finish 32 (box 135), or subsequent thereto (when cooling occurs according to box 132), the blow medium is injected into the preform 20 (box 134); the injection of the blow medium causing radial expansion of the preform 20 and formation of the container. Once formed, the resultant container is removed from the mold 26 at box 138.

Optionally, the method may include the application of a counter pressure to the exterior of the finish. This is designated at box 136. In providing a counter pressure, the exhausting of the cooling medium is controlled instead of freely allowing such exhausting to occur. Control of the exhausting is done to achieve the desired counter pressure and can be done by various techniques. For example, one technique for controlling the exhausting of the cooling medium is to limit the total area of the exhaust gap 96 or outlet passageway(s) 98 relative to the inlet passageway(s)/ports 82, 76, 78 for the cooling medium. If the exhaust gap 96 or outlet passageway(s) 98 have a cumulative area that is smaller than the cumulative area of the inlet passageway(s)/ports 82, 76, 78, a counter pressure will be produced about the finish 32 of the preform 20. By controlling the difference between these cumulative areas, along with the pressure at which the blow medium is provided, the counter pressure applied to the finish can be controlled. Alternatively, the outlet passageway may include a valve and/or variable restriction 110, 112 that is used to control the exhausting of the exhausting of the cooling medium to achieve the same effect. In another alternative, the cooling medium is not exhausted through any means. With this latter technique, the counter pressure applied to the finish 32 is the pressure at which the cooling medium is supplied.

Figure 11:
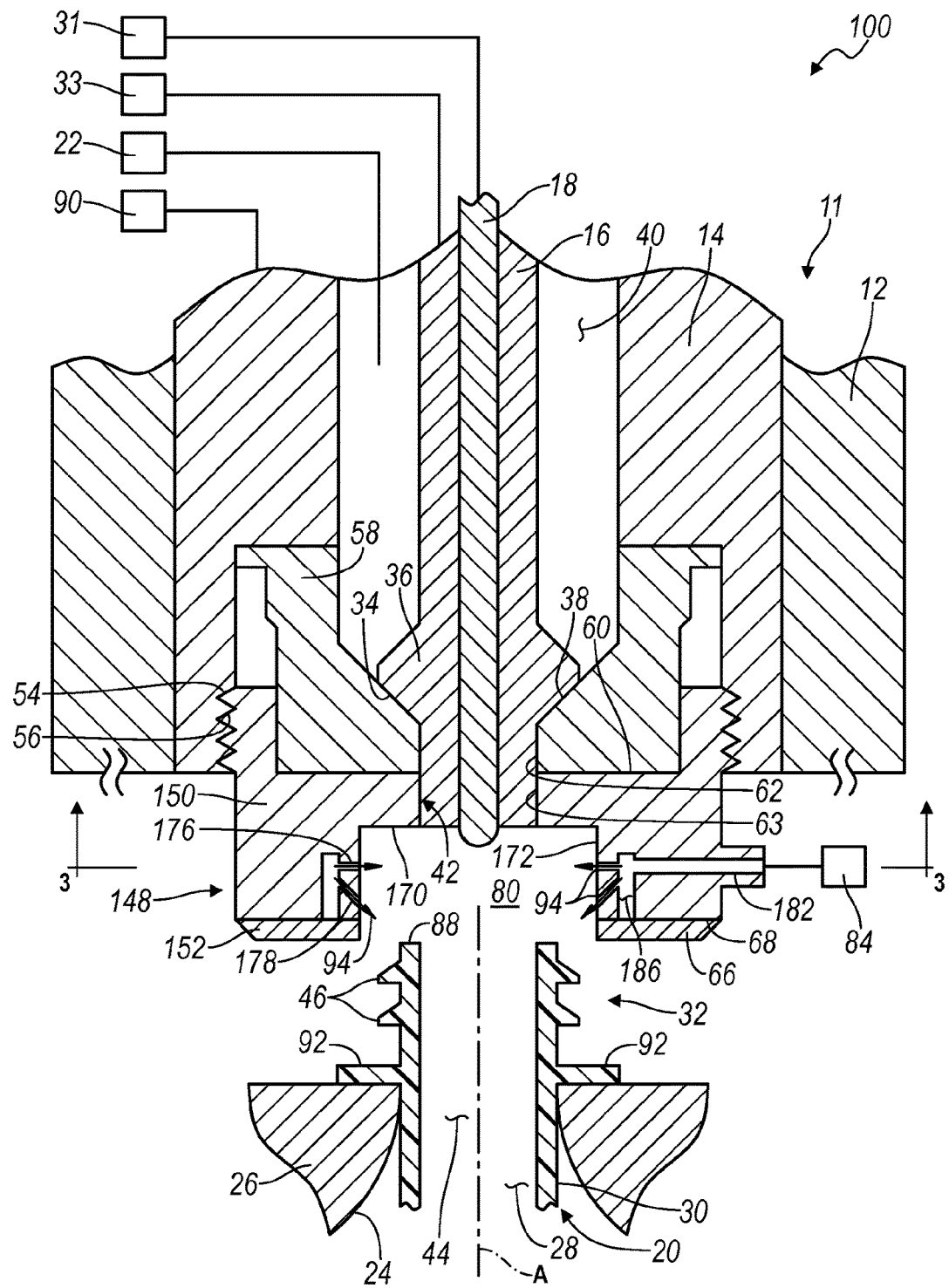
FIG. 11 is a is a cross-sectional view of a further embodiment of a hydraulic blow molding machine, incorporating the principles of the present invention, before engagement of the injection nozzle with a preform.
Figure 12:
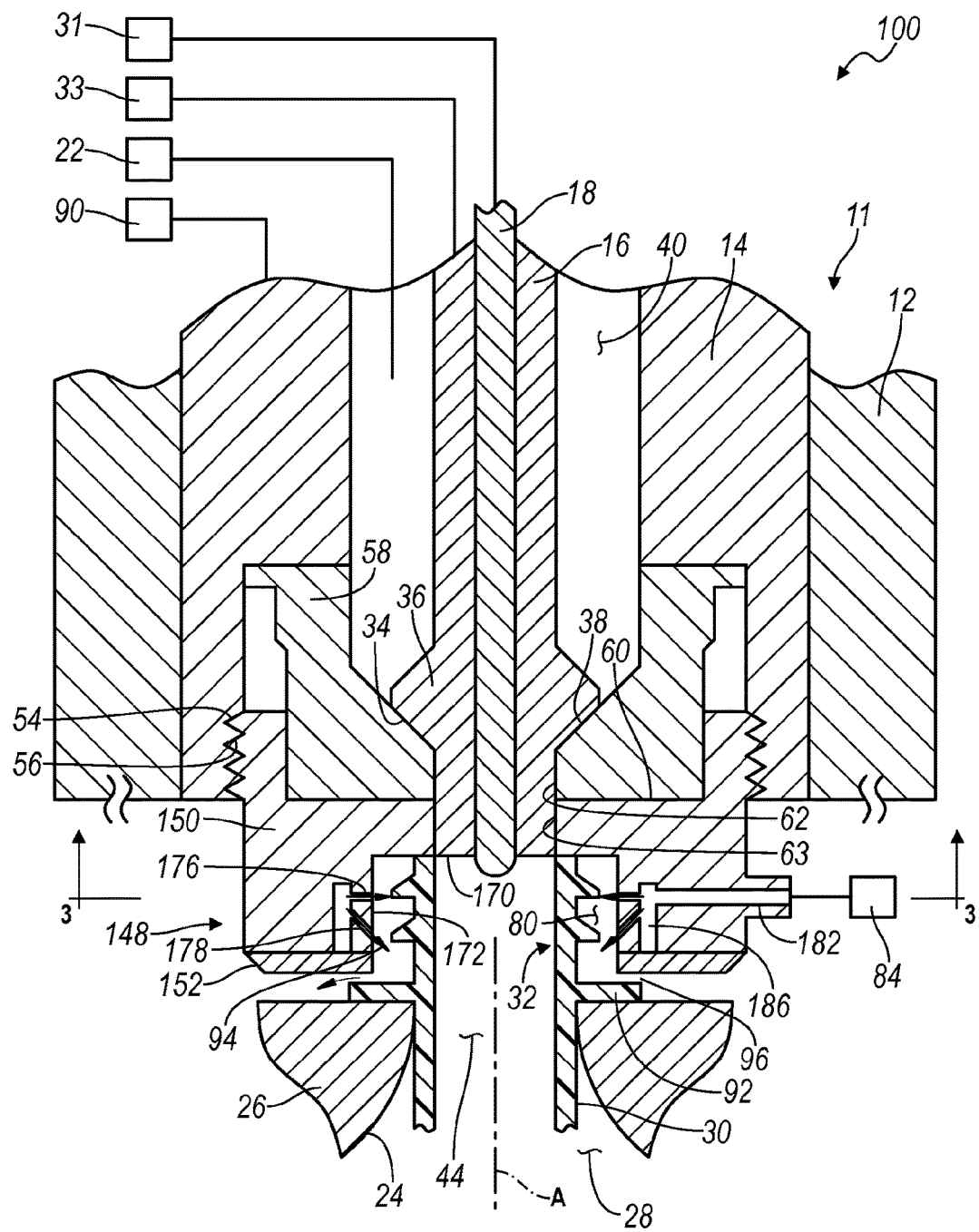
FIG. 12 is a cross-sectional view of the hydraulic blow molding machine seen in FIG. 11 after engagement of the injection nozzle with the preform and showing the exhausting of air between the injection nozzle and the support ring of the preform.

The above discussion details the incorporation of the present method into a system 10 where the injection nozzle 14 incorporates a nozzle body 48 in the form of a manifold. The method, however, may be employed in a system 100 where the nozzle body 48 is not in the form of a manifold. Such a system is illustrated in FIGS. 11 and 12. In these figures, common elements from the earlier embodiments are identified with like reference numerals and operate/function in the same manner as previously discussed. These common elements are therefore not further discussed in connection with FIGS. 11 and 12. Instead, only the differing features of FIGS. 11 and 12 will now be discussed.

As seen in FIGS. 11 and 12, the end of the injection nozzle 14 is constructed to provide for the cooling of the finish 32 during a hydraulic blow molding process. Like the prior embodiments, the cooling device or nozzle body 148 is provided as an integral part of the injection nozzle 14. Unlike the prior embodiments, the nozzle body 148 is not provided as a manifold, but does include a bell housing 150 and an end plate 152.

As illustrated, the bell housing 150 is secured to the lower end of the injection nozzle 14 by the engagement of external threads 54 of the bell housing 150 with internal threads 56 of the injection nozzle 14. Other securement means, such as threaded fasteners, could alternatively be employed for this purpose. The bell housing 150 is also used to secure the sealing bell 58 to the injection nozzle 14 as an integral part thereof, in the same manner as discussed above with the prior embodiments.

In the lower end of the bell housing 150, opposite of the upper recess 60, the bell housing 150 includes a lower recess 164 formed by a base wall 170 and a cylindrical wall 172 that extends from the base wall 170 and that is coaxial with the axis-A. Together, the base wall 170 and the cylindrical wall 172 cooperate to define a receiving space 180 within which the preform is received.

Formed in the cylindrical wall 172 are ports 176, 178 that are, respectively directed radially and obliquely relative to the axis-A. The ports 176, 178 are arranged in two or more rows around the cylindrical wall 172, and may be further arranged such that the ports of one row are radially aligned or radially offset from the ports of the other row, as with the prior embodiments in a manner similar to that seen in FIG. 8.

The bell housing 150 additionally includes an inlet passageway 182 that is coupled to a pressurized source of the cooling medium 84. As previously discussed, the medium is preferably air or another gaseous fluid. The inlet passageway 182 may be provided in a variety of configurations. In the illustrated variant, the inlet passageway 182 extends straight through the wall of the bell housing 150 and branches into a circumferential passageway 184 that extends about the cylindrical wall 172 and receiving space 180. The ports 176, 178 mentioned above extend through the cylindrical wall 172 and communicate the receiving space 180 with the circumferential cavity 186. Air received into the circumferential passageway 184 is passed through and directed by the ports 76, 78 into the receiving space 80, and as discussed above, at the finish 32 of a preform 20 located therein.

For manufacturing purposes the circumferential passageway 184 may be formed, at least in part, as an open circumferential groove in the bell housing 150; the groove being open through the end face 68 end of the bell housing 150. To form the circumferential passageway 186 and close off the groove, the aforementioned end plate 152 may be coextensive with the end face 68 and attached to the bell housing 150 over the groove.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A method of forming a plastic container from a preform and filling the same, the method comprising the steps of:
   providing a preform having a body with a finish defined on one end of the preform;
   engaging an injection nozzle with the finish to form a first sealed engagement between the injection nozzle and the finish, the first sealed engagement separating an inner volume from an exterior side of the finish;
   injecting a liquid blow medium into the preform to expand the body of the preform within a mold thereby simultaneously forming a container and filling the container with the liquid, the method characterized by
   applying a cooling medium at the exterior side of the finish, the cooling medium being provided at a temperature that is less than the temperature of the finish, wherein the step of applying the cooling medium includes supplying the cooling medium to the injection nozzle and uniformly directing the cooling medium at the finish.

2. The method of claim 1, wherein the step of applying the cooling medium to the finish is initiated at least after the step of engaging the injection nozzle with the finish.

3. The method of claim 1, wherein the step of applying the cooling medium to the finish is initiated at least before the step of engaging the injection nozzle with the finish.

4. The method of claim 1, wherein the step of applying the cooling medium to the finish occurs both before and after the step of engaging the injection nozzle with the finish.

5. The method of claim 1, further comprising the step of forming a second sealed engagement between the injection nozzle and one of the preform and the mold, the second sealed engagement being axially spaced from the first sealed engagement along the preform.

6. The method of claim 5, wherein the second sealed engagement is formed between the injection nozzle and a portion of the mold.

7. The method of claim 1, where in the step of circulating of the cooling medium is done one of continuously or intermittently.

8. The method of claim 1, wherein the cooling medium is directed perpendicularly at the finish.

9. The method of claim 1, wherein the cooling medium is directed obliquely at the finish.

10. The method of claim 1, further comprising the step of thermally conditioning the preform prior to the positioning step.

11. The method of claim 1, further comprising the step of providing a counter pressure about the finish.

12. A method of forming a plastic container from a preform and filling the same, the method comprising the steps of:
   providing a preform having a body with a finish defined on one end of the preform;
   engaging an injection nozzle with the finish to form a first sealed engagement between the injection nozzle and the finish, the first sealed engagement separating an inner volume from an exterior side of the finish;
   forming a second sealed engagement between the injection nozzle and one of the preform and the mold, the second sealed engagement being axially spaced from the first sealed engagement along the preform, the second sealed engagement being formed between the injection nozzle and a support ring of the preform;
   injecting a liquid blow medium into the preform to expand the body of the preform within a mold thereby simultaneously forming a container and filling the container with the liquid; and
   applying a cooling medium at the exterior side of the finish, the cooling medium being provided at a temperature that is less than the temperature of the finish, wherein the step of applying the cooling medium further comprises supplying the cooling medium to the injection nozzle and uniformly directing the cooling medium at the finish.

13. A method of forming a plastic container from a preform and filling the same, the method comprising the steps of:
   providing a preform having a body with a finish defined on one end of the preform;
   engaging an injection nozzle with the finish to form a first sealed engagement between the injection nozzle and the finish, the first sealed engagement separating an inner volume from an exterior side of the finish;
   injecting a liquid blow medium into the preform to expand the body of the preform within a mold thereby simultaneously forming a container and filling the container with the liquid, the method characterized by
   applying a cooling medium at the exterior side of the finish during lowering of the injection nozzle, the cooling medium being provided at a temperature that is less than the temperature of the finish, the step of applying the cooling medium including supplying the cooling medium to the injection nozzle and uniformly directing the cooling medium at the finish.

14. A method of forming a plastic container from a preform and filling the same, the method comprising the steps of:
   providing a preform having a body with a finish defined on one end of the preform;
   engaging an injection nozzle with the finish to form a first sealed engagement between the injection nozzle and the finish, the first sealed engagement separating an inner volume from an exterior side of the finish;
   injecting a liquid blow medium into the preform to expand the body of the preform within a mold thereby simultaneously forming a container and filling the container with the liquid;
   applying a cooling medium at the exterior side of the finish, the cooling medium being provided at a temperature that is less than the temperature of the finish, the step of applying the cooling medium further including supplying the cooling medium to the injection nozzle and uniformly directing the cooling medium at the finish; and
   providing a counter pressure about the finish by restricting the exhausting of the cooling medium from a receiving space located about the finish.

15. The method of claim 14, wherein the step of restricting the exhausting of the cooling medium is performed by providing an exhaust gap or outlet passageway with a reduced cross-sectional area relative to a cumulative cross-sectional area of an inlet passageway or ports.

16. The method of claim 14, wherein the step of restricting the exhausting of the cooling medium is performed by controlling a variable restriction of an outlet passageway for the cooling medium.

17. The method of claim 14, wherein the step of restricting the exhausting of the cooling medium is performed by providing no exhausting of the cooling medium.

18. The method of claim 11, wherein the step of providing the counter pressure includes providing a continuous or intermittent flow of the cooling medium.

* * * * *